United States Patent
Long et al.

(10) Patent No.: US 11,943,718 B2
(45) Date of Patent: Mar. 26, 2024

(54) METHOD AND SYSTEM FOR MANAGING BASE STATION WIRELESS COMMUNICATIONS TO SAVE POWER

(71) Applicant: Nanning FuLian FuGui Precision Industrial Co., Ltd., Nanning (CN)

(72) Inventors: Kai-Si Long, Nanning (CN); Wei Teng, Shenzhen (CN); Quan-Lin Wu, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 303 days.

(21) Appl. No.: 17/564,613

(22) Filed: Dec. 29, 2021

(65) Prior Publication Data

US 2023/0099735 A1    Mar. 30, 2023

(30) Foreign Application Priority Data

Sep. 30, 2021    (CN) .......................... 202111166012.8

(51) Int. Cl.
| | |
|---|---|
| H04W 52/28 | (2009.01) |
| H04W 52/14 | (2009.01) |
| H04W 52/22 | (2009.01) |
| H04W 64/00 | (2009.01) |

(52) U.S. Cl.
CPC ....... *H04W 52/285* (2013.01); *H04W 52/143* (2013.01); *H04W 52/226* (2013.01); *H04W 64/00* (2013.01)

(58) Field of Classification Search
CPC ............. H04W 52/143; H04W 52/146; H04W 52/226; H04W 52/283; H04W 52/285; H04W 64/00; Y02D 30/70
See application file for complete search history.

(56) References Cited

U.S. PATENT DOCUMENTS

| | | | | |
|---|---|---|---|---|
| 6,490,460 | B1* | 12/2002 | Soliman | H04W 52/28 455/69 |
| 2019/0289557 | A1* | 9/2019 | Li | H04W 52/283 |
| 2021/0400595 | A1* | 12/2021 | Sutskover | H04W 52/226 |
| 2023/0344635 | A1* | 10/2023 | Shi | H04L 9/08 |

FOREIGN PATENT DOCUMENTS

| | | |
|---|---|---|
| CN | 102362518 A | 2/2012 |
| CN | 102413557 A | 4/2012 |

\* cited by examiner

*Primary Examiner* — Nguyen T Vo
(74) *Attorney, Agent, or Firm* — ScienBiziP, P.C.

(57) ABSTRACT

A system and method for managing and controlling power of base station when a connectable terminal device is moving at speed through the coverage area of the base station, the method obtains a transmission power from a terminal through the base station; obtains location of the terminal, and generates a transmission power conversion table according to the terminal transmission power and the terminal location. The transmission power conversion table is transmitted to the terminal by the base station, the transmission power being used by the terminal according to the transmission power conversion table, avoiding repeated communications and electrical energy cost between base station and terminal in respect of the changing location of the terminal.

20 Claims, 6 Drawing Sheets

METHOD AND SYSTEM FOR MANAGING BASE STATION WIRELESS COMMUNICATIONS TO SAVE POWER

CROSS-REFERENCE TO RELATED APPLICATIONS

This application claims priority to Chinese Patent Application No. 202111166012.8 filed on Sep. 30, 2021 in China National Intellectual Property Administration, the contents of which are incorporated by reference herein.

FIELD

The subject matter herein generally relates to wireless communication technology field.

BACKGROUND

A base station is a key infrastructure of communication network. In one application scenario of the base station, a terminal in a vehicle, for example, can move at a high speed. Therefore, in order to ensure a stable communication between the terminal and the base station, the base station applies constant or very frequent checks on signal power as a means of power control, this has a high resource cost and also causes high power consumption in the terminal.

Internet for specific industries is becoming popular. Currently, an industry specific Internet to accommodate high-speed moving scenarios does not exist.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
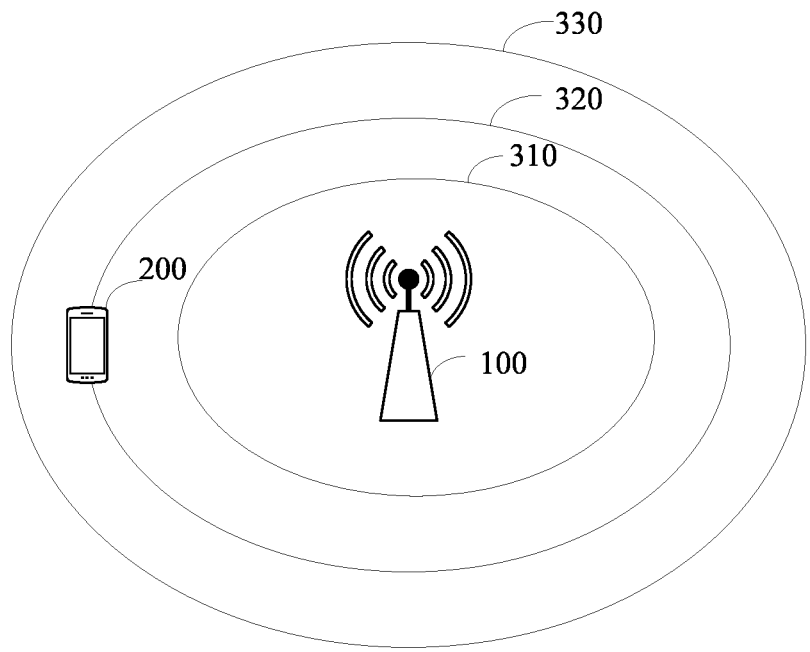
FIG. 1 is a diagram of an embodiment of a wireless communication scenario according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

A base station is a key infrastructure of communication network. In one application scenario of the base station, a terminal is moving at a high speed. To ensure a stable communication between the terminal and the base station, the base station conducts frequent power control checks, occupying a high resource cost of a control signaling and increasing a power consumption of the terminal.

The present disclosure provides a method and system for power control, which increases bandwidth utilization by the base station, reduces the resource cost of the control signaling, and reduces power cost at the terminal.

FIG. 1 illustrates a communication scenario between a base station and a terminal according to one embodiment of the present disclosure. As shown in FIG. 1, a base station 100 establishes communication with a terminal 200. A signal coverage of the base station 100 can be divided into N signal regions, N being a positive integer. For example, the signal coverage can be divided into three signal regions, which is a first region 310, a second region 320, and a third region 330. Each region is a concentric circle or a concentric ellipse, for instance, as shown in FIG. 1, each of the first region 310, the second region 320, and the third region 330 is an ellipse in shape. The manner of division into signal regions of the base station 100 is not limited in the present disclosure. In fact, the higher the value of N, the finer the power control will be.

In one embodiment of the present disclosure, the terminal 200 makes a connection with the base station 100. After the terminal 200 establishes communication with the base station 100, the base station 100 establishes a transmission power conversion table and sends the transmission power conversion table to the terminal 200. When the terminal 200 is displaced (i.e., moved), the terminal 200 may obtain a transmit power corresponding to the moving distance and the transmission power conversion table. The terminal 200 communicates with the base station 100 according to the obtained transmission power conversion table.

Figure 2:
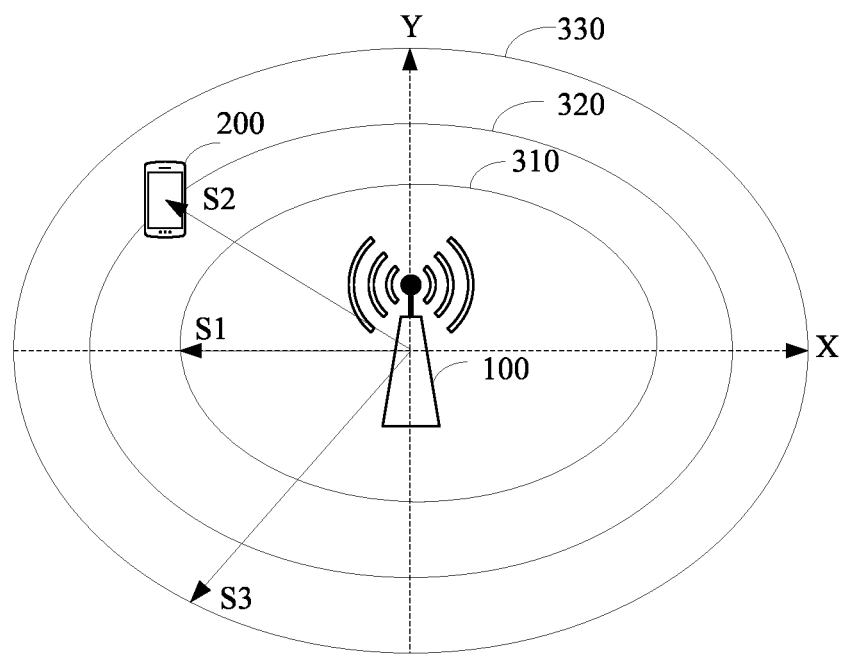
FIG. 2 is a diagram of another embodiment of a communication scenario according to the present disclosure.

The method for generating the transmit power map is described below with respect to FIG. 2. As shown in FIG. 2, after the terminal 200 connects to the base station 100, the base station 100 controls transmission power with the terminal 200 in a closed loop way. The base station 100 obtains a transmit power of the terminal 200, noted as $P_{ref}$. Then, the base station 100 establishes a two-dimensional coordinate system (including an x axis and a y axis) with its own position as an origin. The base station 100 obtains a distance between the terminal 200 and the base station 100, noted as S. The base station 100 calculates the per unit distance transmit power $P_{avg}$ according to a formula (1).

$$P_{avg} = \frac{P_{ref}}{S} \tag{1}$$

After obtaining the per unit distance transmit power $P_{avg}$, the base station 100 calculates a transmit power P of the terminal 200 in different regions according to the per unit distance transmit power $P_{avg}$ and a formula (2).

$$P = P_{avg} * S \qquad (2)$$

S is the distance between the terminal 200 and the base station 100.

In order to simplify the transmission power conversion table, the base station 100 can calculate different transmission powers of different signal regions. For example, the base station 100 can divide the signal coverage into the first region 310, the second region 320, and the third region 330, and calculate the distances S1, S2, and S3 between edge of each regions and the base station 100. In one embodiment, the base station 100 can calculate transmit power P1, P2, and P3 of the terminal 200 in the respective first region 310, the second region 320, and the third region 330 to the formula (2).

In some embodiments, when the base station 100 establishes the transmission power conversion table, the base station 100 calculates the distance S between the terminal 200 and the base station 100 according to global positioning system (GPS) or received signal strength indication (RSSI).

For instance, in some embodiments, if the base station 100 is disposed outdoors and the terminal 200 includes a GPS chip, the distance between the terminal 200 and the base station 100 can be calculated by using GPS positioning. When calculating the distance using GPS positioning, the base station 100 transmits a Location Request message to the terminal 200. The terminal 200 transmits a current GPS coordinate to the base station 100. The base station 100 generates a transmission power conversion table according to the current GPS coordinate of the terminal 200 and the GPS coordinate of the base station 100. The base station 100 transmits the transmission power conversion table to the terminal 200. The transmission power conversion table further includes a GPS coordinate of the terminal 200, so that the terminal 200 calculates a distance from the base station 100 when the terminal 200 is moved.

In some embodiments, if the base station 100 is disposed indoors or in an area where the GPS signal cannot be received or the received GPS signal is weak, the distance between the terminal 200 and the base station 100 can be calculated using the RSSI. Specifically, when the base station 100 calculates the distance using the RSSI, the base station 100 transmits a location requirement message to the terminal 200. The terminal 200 calculates the distance between the terminal 200 and the base station 100 based on the RSSI strength in a Beacon broadcast packet. When the distance S between the terminal 200 and the base station 100 is calculated using the RSSI, the following formula (3) is applied.

$$S = 10^{\frac{|RSSI|-A)}{10*n}} \qquad (3)$$

The parameter RSSI is a signal intensity of the terminal 200 received (Negative value). The parameter A is the signal intensity when the distance between the terminal 200 and the base station 100 is 1 meter. The parameter n is an environmental attenuation factor. The parameter RSSI needs to take the absolute value since the RSSI is a negative value, which converts the RSSI value to a positive value through absolute value calculation for subsequent calculations.

The base station 100 generates the transmission power conversion table according to the distance transmitted by the terminal 200 and transmits the transmission power conversion table to the terminal 200.

In one embodiment, in order to reduce the amount of data of the transmission power conversion table of the base station 100, the transmit power in the transmission power conversion table may be set to different steps according to different areas. For example, when the terminal 200 is in the first region 310, the transmit power is set at P1. When the terminal 200 is in the second region 320, the transmit power is P2. When the terminal 200 is in the third region 330, the transmit power is P3.

In one embodiment, after the base station 100 transmits the transmission power conversion table to the terminal 200, the base station 100 sets an interval period T. The base station 100 does not generate the transmission power conversion table during the interval period T. Obviously, setting the interval period T reduces communication frequency between the base station 100 and the terminal 200, reducing the signaling cost of the terminal 200, and further reducing the power consumption of the terminal 200. Within interval period T, the terminal 200 adjusts the transmit power according to the transmission power conversion table transmitted by the base station 100 and the distance between the terminal 200 and the base station 100, so as to implement closed-loop power control at the terminal 200.

Figure 3:
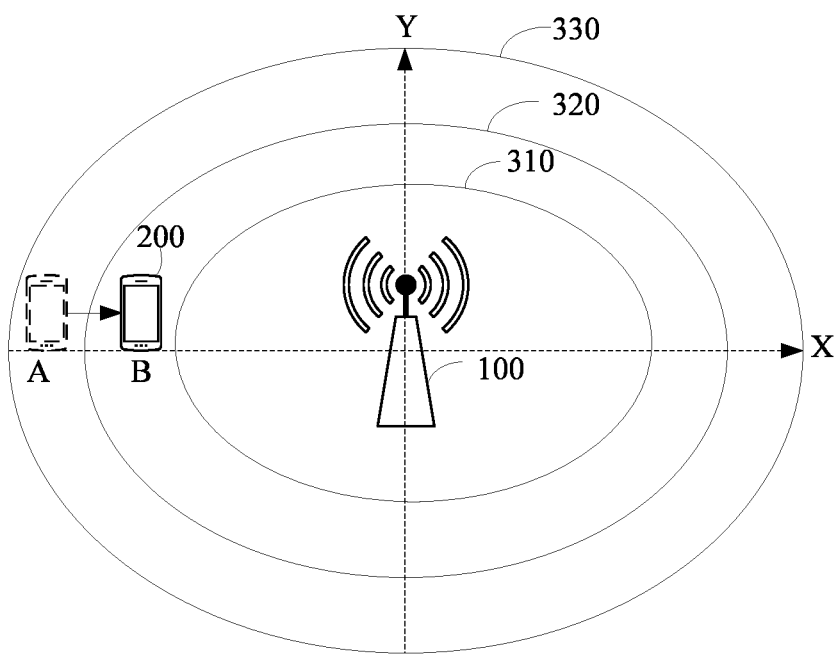
FIG. 3 is a diagram of another embodiment of a communication scenario according to the present disclosure.

The base station 100 sets the interval period T by a timer. Specifically, referring to FIG. 3, when the terminal 200 is displaced within the interval period T, the terminal 200 adjusts the transmit power according to the located area and the transmission power conversion table without performing frequent closed-loop power control. For example, when the terminal 200 moves from point A to point B, the terminal 200 checks the transmission power conversion table to establish that the terminal 200 moves from the third area 330 to the second area 320. The terminal 200 adjusts the transmit power of the terminal 200 from the transmit power P3 at point A to the transmit power P2 in the second area according to the power value corresponding to the transmission power conversion table. As another example, when the terminal 200 detects that the position moves from the second area 320 to the first area 310 through the transmission power conversion table, the transmit power of the terminal 200 is adjusted from P2 to P1.

When the terminal 200 moves, if the position of the terminal 200 is at a boundary of the two areas, the higher transmission power of two possible powers corresponding to the two areas is selected, so as to avoid communication quality being affected by insufficient transmission power of the terminal 200 at the boundary of the areas.

After the interval period T, the base station 100 re-obtains the transmit power of the terminal 200 to establish a new transmission power conversion table. The method of establishing a new transmission power conversion table can be referred to in conjunction with FIG. 2 and is not described herein again.

If the distance between the terminal 200 and the base station 100 is calculated through RSSI, the base station 100 needs to send the Beacon broadcast packet in timely manner.

Figure 4:
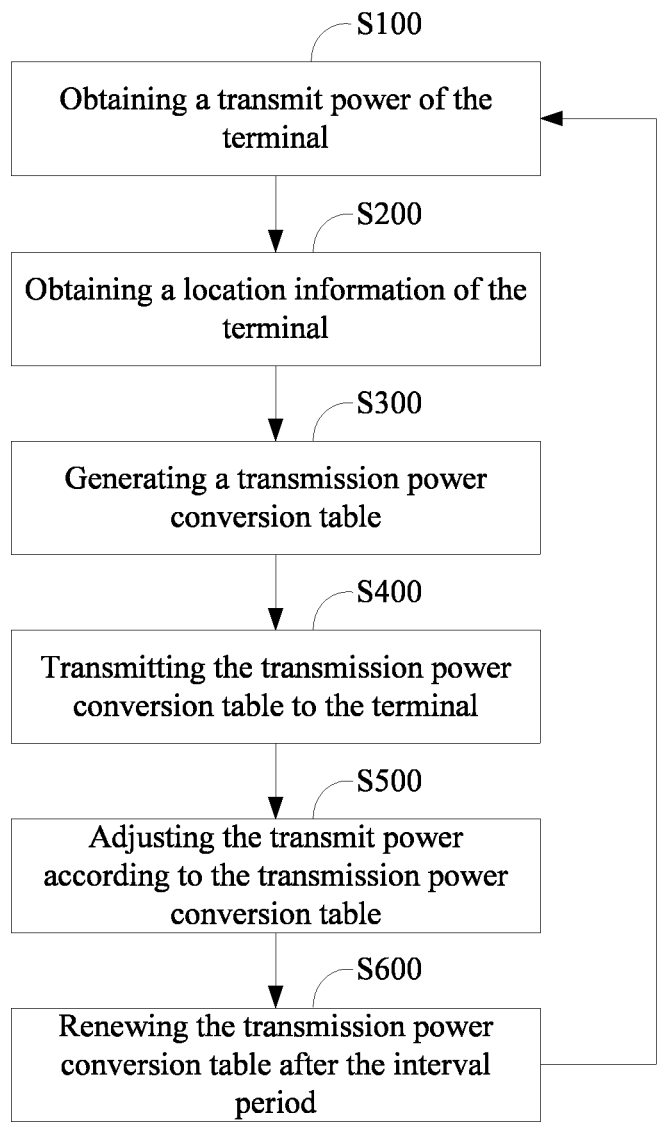
FIG. 4 is a flowchart of an embodiment of a method for managing communication power in a base station according to the present disclosure.

FIG. 4 illustrates a flowchart of an embodiment of the method for controlling power. The embodiment is provided by way of example, as there are a variety of ways to carry out the method. The method includes obtaining a transmit power of the terminal; obtaining a location information of the terminal; generating a transmission power conversion table; transmitting the transmission power conversion table to the terminal; adjusting the transmission power according to the transmission power conversion table; and renewing the transmission power conversion table after an interval period. The method described below can be carried out using the configurations illustrated in FIGS. 1, 2, and 3, for example, and various elements of these figures are referenced in explaining the embodiment. Each block shown in FIG. 4 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S100.

At block S100, the base station 100 obtains the transmit power of the terminal 200. The base station 100 transmits Downlink Control Information (DCI) to the terminal 200 through Physical Downlink Control Channel (PDCCH) to obtain Sounding Reference Signal (SRS).

The terminal 200 sends the SRS to the base station 100.

The base station 100 generates control instruction according to the SRS testing result. The base station 100 transmits the SRS testing result to the terminal 200 through Total Power Control (TPC) message.

The terminal 200 calculates the transmit power according to the TPC message. The terminal 200 transmits Uplink Control Information (UCI) to the base station 100 through Physical Uplink Control Channel (PUCCH) or Physical Uplink Shared Channel (PUSCH). The base station 100 obtains the transmit power of the terminal 200 through UCI information which is received.

At block S200, the base station 100 obtains location information of the terminal 200. Specifically, the base station 100 sends location request to the terminal 200, and the terminal 200 transmits location information to the base station 100.

At block S300, the base station 100 generates the transmission power conversion table according to the location information of the terminal 200. The location information of the terminal 200 includes the GPS coordinate or RSSI information. The base station 100 generates the transmission power conversion table according to the GPS coordinate or RSSI information and the transmission power of the terminal 200. See FIG. 2 for the method of generating the transmission power conversion table.

At block S400, the base station 100 transmits the transmission power conversion table to the terminal 200. Specifically, the base station 100 transmits downlink control information to the terminal 200 through Physical Downlink Shared Channel. The downlink control information includes the transmission power conversion table.

At block S500, the terminal 200 adjusts the transmit power according to the transmission power conversion table. The method of adjusting the transmit power according to the transmission power conversion table can be referred to in conjunction with FIG. 2 and is not described herein again.

At block S600, the base station 100 moves back to block S100 to renew the transmission power conversion table after the interval period.

The method of renewing the transmission power conversion table can be referred to in conjunction with FIG. 2 and is not described herein again.

Figure 5:
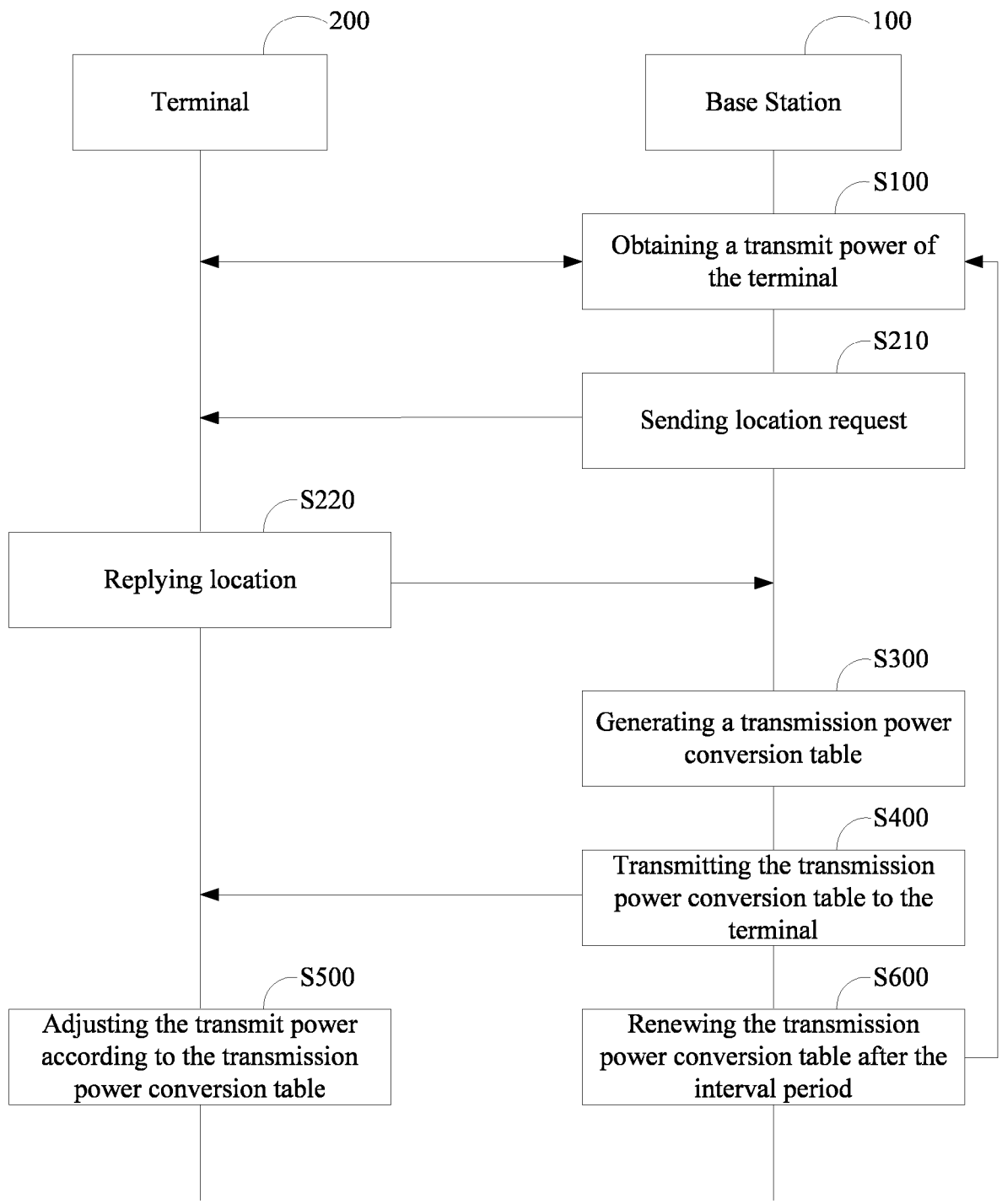
FIG. 5 is a flowchart of an embodiment of a method for controlling power according to the present disclosure.

FIG. 5 illustrates interaction between the terminal 200 and the base station 100 in one embodiment of the power control method. Blocks S100, S200, S300, S400, S500, and S600 are same as blocks S100, S200, S300, S400, S500, and S600 in FIG. 4, which can be referred to in conjunction with FIG. 4 and is not described herein again. The block S200 further includes the following steps.

At block S210 and block S220, the base station 100 transmits the downlink control information to the terminal 200 through Physical Downlink Shared Channel. The downlink control information includes the transmission power conversion table.

After receiving the location request, the terminal 200 sends an uplink control information message to the base station 100 through a physical uplink control channel or a physical uplink shared channel, where the uplink control information message carries location information of the terminal 200.

Figure 6:
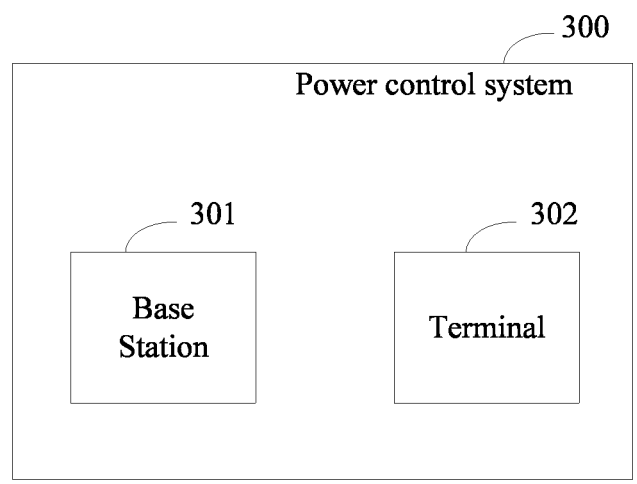
FIG. 6 is a diagram showing interactions in a power control system in one embodiment according to the present disclosure.

Referring to FIG. 6, the present embodiment further provides a power control system 300. The power control system 300 includes a base station 301 and a terminal 302. The base station 301 can be the base station 100 described above, and is configured to perform the steps S100, S210, S300, S400 and S600. Specifically, refer to FIG. 4 to FIG. 5. The terminal 302 may be the terminal 200 described above, and is configured to execute the step S220 and the step S500, which may specifically refer to FIG. 4 to FIG. 5 and the related description thereof, and will not be described herein again.

The base station 301 in the above embodiment can also be implemented as an aggregate (group of several devices). Each device constituting the device group may include a part or all of the functions or functional blocks of the base station 301 according to the above embodiment. The device group may have all the functions or functional blocks of the base station 301. Further, the terminal 302 according to the above embodiment can also communicate with the base station 301 as part of an aggregation.

In the power control method and the power control system 300 provided in the embodiment of the present application, the base station 301 may calculate the transmission power comparison table, the terminal 302 is not required to calculate the transmission power comparison table, thereby reducing the power consumption and the response time of the terminal 302. The base station 301 and the terminal 302 only perform calculation by reference to the transmission power comparison table once within an interval period T, thereby reducing the signaling overhead and improving the utilization rate of the data bandwidth.

Each calculation of the transmission power comparison table is closed-loop control, and the terminal 302 is required to repeatedly transmit a detection signal, which has higher power consumption, whereas the power control method provided by the embodiment of the present application performs a calculation only once in each interval period, which reduces the power consumption of the terminal 302.

It can be understood that the power control method and the power control system 300 provided in the embodiment of the present application may be based on the existing communication architecture and device, the hardware level does not need to be modified, thereby reducing the deployment difficulty. For example, the power control method and the power control system provided in the embodiment of the present application may be deployed in an industrial interne and may be implemented only by installing an algorithm and a flow logic program in the base station 301.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A power control system comprising:
a terminal; and
a base station connecting to the terminal, obtaining a transmit power from the terminal, and obtaining a location information from the terminal;
wherein the base station generates a transmission power conversion table according to the transmit power and the location information, and transmits the transmission power conversion table to the terminal; and
wherein the terminal adjusts the transmit power according to the transmission power conversion table.

2. The power control system of claim 1, wherein:
the terminal sets at least two levels of the transmit power according to the transmission power conversion table and a distance between the terminal and the base station.

3. The power control system of claim 2, wherein:
the terminal adjusts the level of the transmit power of the terminal according to the transmission power conversion table and the location information within an interval period.

4. The power control system of claim 3, wherein:
the base station maintains the transmission power conversion table within the interval period, and sets the interval period according to a timer.

5. The power control system of claim 4, wherein:
the base station renews the transmission power conversion table after the interval period;
the base station sends the renewed transmission power conversion table to the terminal.

6. The power control system of claim 3, wherein:
the terminal obtains the displaced information of the terminal, obtains the location information of the terminal according to the displaced information, and obtains the level of the transmit power according to the location information.

7. The power control system of claim 6, wherein:
the terminal selects the level of the transmit power with a higher power when obtaining two levels of the transmit power.

8. The power control system of claim 2, wherein:
the base station sets the level of the transmit power according to the distance between the terminal and the base station; and
wherein, the power of the level of the transmit power is proportional to the distance between the terminal and the base station.

9. The power control system of claim 2, wherein:
the base station divides a signal coverage of the base station into three signal regions.

10. The power control system of claim 9, wherein a shape of each of the three signal regions is ellipse.

11. A power control method applicable to a power control system, the power control method comprising:
obtaining a transmit power from a terminal through a base station;
obtaining a location information from the terminal through the base station;
generating a transmission power conversion table according to the transmit power and the location information through the base station;
transmitting the transmission power conversion table to the terminal through the base station; and
adjusting the transmit power according to the transmission power conversion table through the terminal.

12. The power control method of claim 11, further comprising:
setting at least two levels of the transmit power according to the transmission power conversion table and a distance between the terminal and the base station through the terminal.

13. The power control method of claim 12, further comprises:
adjusting the level of the transmit power of the terminal according to the transmission power conversion table and the location information within an interval period through the terminal.

14. The power control method of claim 13, further comprises:
maintaining the transmission power conversion table within the interval period, and setting the interval period according to a timer through the base station.

15. The power control method of claim 14, further comprises:
renewing the transmission power conversion table after the interval period through the base station;
sending the renewed transmission power conversion table to the terminal.

16. The power control method of claim 13, further comprises:
obtaining the displaced information of the terminal through the terminal;
obtaining the location information of the terminal according to the displaced information through the base station;
obtaining the level of the transmit power according to the location information through the terminal.

17. The power control method of claim 16, further comprises:
selecting the level of the transmit power with a higher power when obtaining two levels of the transmit power through the terminal.

18. The power control method of claim 12, further comprises:
setting the level of the transmit power according to the distance between the terminal and the base station through the base station;
wherein, the power of the level of the transmit power is proportional to the distance between the terminal and the base station.

19. The power control method of claim 12, further comprises:
dividing a signal coverage of the base station into three signal regions through the base station.

20. The power control method of claim 19, wherein a shape of each of the three signal regions is ellipse.

* * * * *